(12) United States Patent
Fowler

(10) Patent No.: US 8,157,311 B2
(45) Date of Patent: Apr. 17, 2012

(54) VEHICULAR TRIM PANEL WITH STORAGE AND INTERFACING OF ELECTRONIC DEVICES

(75) Inventor: James H. Fowler, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 12/722,272

(22) Filed: Mar. 11, 2010

(65) Prior Publication Data

US 2011/0220430 A1  Sep. 15, 2011

(51) Int. Cl.
   *B60R 7/06*  (2006.01)
(52) U.S. Cl. .................................. 296/37.12
(58) Field of Classification Search ............ 296/37.12, 296/146.7, 146.5, 146.6, 153, 187.05, 214, 296/37.13, 39.1, 70; 280/728.3, 732, 751, 280/728.2, 730.1, 730.2; 49/502; 180/90
   See application file for complete search history.

(56) References Cited

U.S. PATENT DOCUMENTS

| | | | | |
|---|---|---|---|---|
| 4,553,414 A * | 11/1985 | Caputo et al. | ...................... | 70/58 |
| 5,202,913 A * | 4/1993 | Lang et al. | .................. | 455/575.9 |
| 5,447,327 A * | 9/1995 | Jarboe et al. | ............... | 280/728.3 |
| 5,478,106 A * | 12/1995 | Bauer et al. | ................ | 280/728.3 |
| 5,533,748 A * | 7/1996 | Wirt et al. | .................. | 280/728.3 |
| 5,716,091 A * | 2/1998 | Wieczorek | ................ | 296/37.16 |
| 5,839,752 A * | 11/1998 | Yamasaki et al. | .......... | 280/728.3 |
| 5,902,428 A * | 5/1999 | Gallagher et al. | ........... | 156/73.1 |
| 5,904,389 A * | 5/1999 | Vaishnav et al. | ............. | 296/37.1 |
| 5,927,020 A * | 7/1999 | Kobrehel | ........................ | 49/502 |
| 5,979,931 A * | 11/1999 | Totani et al. | ............... | 280/728.3 |
| 6,203,056 B1 * | 3/2001 | Labrie et al. | ................ | 280/728.3 |
| 6,302,437 B1 * | 10/2001 | Marriott et al. | ............... | 280/732 |
| 6,345,837 B1 * | 2/2002 | Warnez et al. | ............. | 280/728.3 |
| 6,364,346 B1 * | 4/2002 | Preisler et al. | ............. | 280/730.2 |
| 6,517,139 B2 * | 2/2003 | Sutou et al. | ...................... | 296/70 |
| 6,843,521 B1 * | 1/2005 | Oana | .............................. | 296/70 |
| 6,902,185 B2 * | 6/2005 | North | ......................... | 280/728.3 |
| 6,938,917 B2 * | 9/2005 | Jahn | ............................ | 280/728.3 |
| 7,063,349 B2 * | 6/2006 | Takahashi | .................. | 280/728.2 |
| 7,159,916 B2 * | 1/2007 | Stack et al. | ................. | 296/24.34 |
| 7,385,308 B2 * | 6/2008 | Yerdon et al. | .................. | 307/9.1 |
| 7,854,459 B2 * | 12/2010 | Jones et al. | .................. | 296/39.1 |
| 7,992,915 B2 * | 8/2011 | Kwolek | ......................... | 296/70 |
| 2001/0013529 A1 * | 8/2001 | Minowa et al. | .................. | 225/1 |
| 2001/0050314 A1 * | 12/2001 | Lee et al. | ....................... | 235/492 |
| 2002/0074776 A1 * | 6/2002 | Labrie et al. | ............... | 280/728.3 |
| 2005/0006918 A1 * | 1/2005 | Neumann et al. | .......... | 296/24.34 |
| 2006/0004485 A1 * | 1/2006 | Thomas | ........................ | 700/232 |
| 2006/0277555 A1 | 12/2006 | Howard et al. | | |
| 2007/0026916 A1 * | 2/2007 | Juds et al. | ......................... | 463/1 |

(Continued)

*Primary Examiner* — Kiran B Patel
(74) *Attorney, Agent, or Firm* — Gregory P. Brown; MacMillian, Sobanski & Todd, LLC

(57) ABSTRACT

An interior system of a vehicle includes an instrument panel substrate having a driver side, a passenger side, and a center section between the driver and passenger sides. The instrument panel substrate has an opening on the passenger side. A trim panel is mounted to the instrument panel substrate covering the opening and comprising a connector hub having a plurality of electrical connectors for mobile electronic devices. In one embodiment, at least a portion of the trim panel is releasable and pivotable after mounting in order to access a rear side of the trim panel. The trim panel may further include a cradle on the rear side to receive a printer, a paper holder on the rear side to receive and supply paper for the printer, and an elongated slot aligned with the cradle for feeding printed paper from the printer to a front side of the trim panel.

7 Claims, 3 Drawing Sheets

U.S. PATENT DOCUMENTS

| | | | |
|---|---|---|---|
| 2007/0169131 A1* | 7/2007 | Campbell et al. | 720/600 |
| 2008/0136144 A1* | 6/2008 | Spahr et al. | 280/728.3 |
| 2008/0153567 A1* | 6/2008 | Juds et al. | 463/16 |
| 2008/0255901 A1* | 10/2008 | Carroll et al. | 705/7 |
| 2009/0033149 A1* | 2/2009 | Patel | 307/10.1 |
| 2009/0296006 A1* | 12/2009 | Campbell et al. | 348/837 |
| 2011/0220430 A1* | 9/2011 | Fowler | 180/90 |

* cited by examiner

VEHICULAR TRIM PANEL WITH STORAGE AND INTERFACING OF ELECTRONIC DEVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to support for mobile electronic devices in an automotive vehicle, and, more specifically, to a trim panel for storage of and interfacing to mobile electronic devices (such as a printer, a fingerprint scanner, or other dockable devices in a police vehicle).

For many people, the interior of a motor vehicle has become a place where diverse work tasks and entertainment activities are performed. Vehicles have become available with electronic interfaces for portable entertainment devices such as mp3 players to allow the user to play audio recordings from the mp3 player through the vehicle's audio system. For certain specialized users such as police officers and traveling business people, a need also exists for using communications and information systems in the vehicle to perform office-like functions. Examples of aftermarket units that may be mounted and used in the vehicle interior include two-way radios, laptop computers, printers, video cameras, wireless microphones, flashlights, and other rechargeable electronic devices.

Conventional practice for many police or commercial vehicles is to deploy, interconnect, and stow small electronic devices or modules in the center stack area of an instrument panel or floor console (i.e., between the driver and the front, side passenger seat). As a result, at least some of the center area of the instrument panel may be become blocked by the added units. Even if existing controls such as the climate control or audio system of the vehicle are not blocked, the availability of the center area for placement or stowing of other devices is reduced.

In the current practice of installing police or other electronic equipment on or in front of the center of the instrument panel or dashboard, an aftermarket installer or police department equipment installer (often called an "up fitter") may need to remove existing electronics or structures to accommodate the new up-fitted devices. The present invention addresses the problem that there is limited or no space available in the center or top of the instrument panel to relocate small electronic devices or personal electronics for stowage or to make connections to the devices for recharging or for communication with other devices in the vehicle.

SUMMARY OF THE INVENTION

The present invention achieves logical and ergonomic placement of mobile electronic devices within a vehicle. A trim panel is used with a modular design that is easy to use and can be easily upgraded, reconfigure, or replaced using the same instrument panel substrate. The panel is low cost, light weight, and preserves the visual styling of the model of vehicle. The trim panel allows the vehicle user to reduce clutter within the cockpit, and achieves improved stowage and management of electronic devices.

In one aspect of the invention, an interior system of a vehicle comprises an instrument panel substrate having a driver side, a passenger side, and a center section between the driver and passenger sides. The instrument panel substrate has an opening on the passenger side. A trim panel is mounted to the instrument panel substrate covering the opening and comprising a connector hub having a plurality of electrical connectors for mobile electronic devices.

DETAILED DESCRIPTION OF PREFERRED EMBODIMENTS

Figure 1:
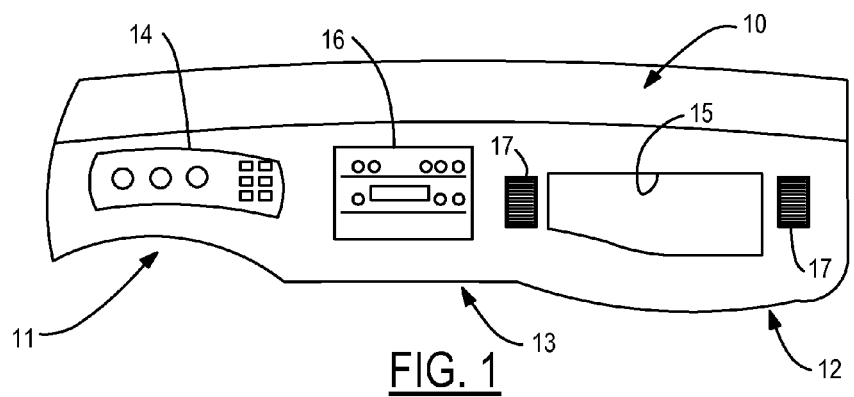
FIG. 1 is a plan view generally showing an instrument panel substrate.

Referring to FIG. 1, an instrument panel substrate 10 generally includes a driver side 11, a passenger side 12, and a center section 13 between driver side 11 and passenger side 12. The driver side 11 may include an instrument cluster 14. Passenger side 12 of substrate 10 includes an opening 15 that will receive a trim panel of the present invention that is described below. Center section 13 may include other openings for receiving manufacturer-installed accessories 16 such as a climate control or an audio system. Instrument panel substrate 10 may include additional openings for receiving ventilation ducts 17 as is known in the art.

Figure 2:
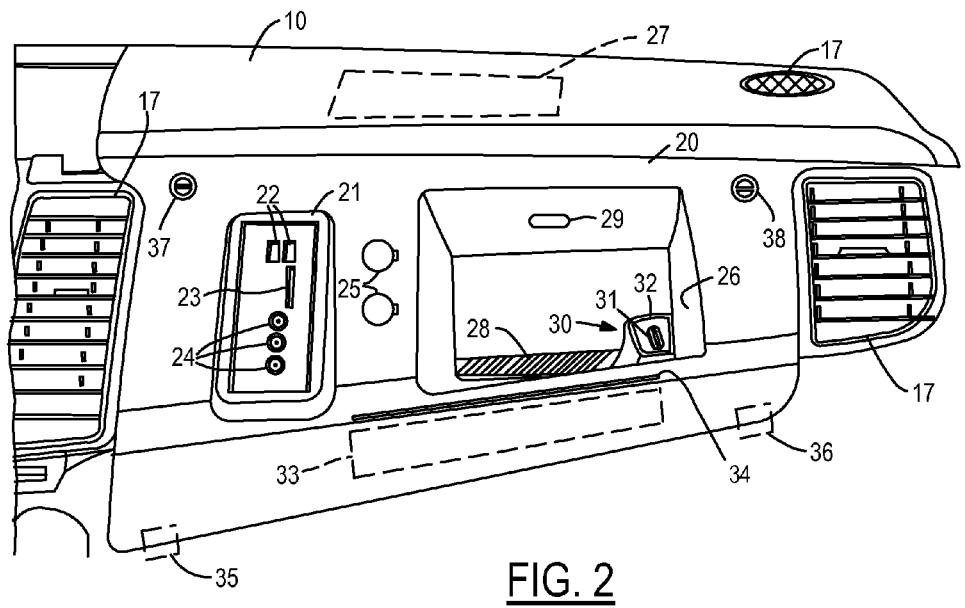
FIG. 2 is a front view of a first embodiment of the trim panel of the present invention.

A first embodiment of the invention is shown in FIG. 2 wherein a trim panel 20 is received in the passenger-side opening of substrate 10. A connector hub 21 is formed as a part of trim panel 20 and provides mounting of a plurality of electrical connectors including USB connectors 22, a media card slot 23, and audio/video plugs 24, for example. Hub 21 may preferably be integrally molded as a single plastic piece with trim panel 20. One or more conventional automotive power points 25 are shown closely associated with hub 21. Power points could alternatively be included within the raised section of hub 21.

Trim panel 20 also preferably includes a storage well 26 that is recessed through the opening in instrument panel substrate 10. Well 26 is placed so that it does not interfere with an existing passenger airbag system which typically has a deployment opening in the top instrument panel substrate 10 as shown at 27. Well 26 may have a non-skid floor surface 28 and a manually or automatically-controlled lamp 29 at the top. Lamp 29 may preferably provide red light in order to assist in maintaining dark adaptation of a police officer's vision during night duty.

Well 26 also includes a docking station 30 with an electrical interface connector 31 and a mounting support surface 32 adapted to receive one or more particular mobile electronic devices such as an MP3 player. Separate adaptor pieces (not shown) may also be provided in the order to accommodate a variety of devices on docking station 30. Docking station 30 may provide power for recharging a mobile device and/or may include communication lines for interfacing a particular device with other electronic units within the vehicle.

As shown in FIG. 2, the present invention also enables placement of electronic devises behind trim panel 20. Thus, a device 33 mounted behind trim panel 20 may have an associated through slot 34 to allow various physical interactions with device 33. In one embodiment, device 33 is comprised of a printer and slot 34 allows printed pages to be output from device 33 through trim panel 24 retrieval by a police officer, for example. In order to permit access for mounting and/or maintaining device 33 mounted behind trim panel 20, one preferred embodiment of the invention makes trim panel 20 releasable and pivotable. A pair of hinges or tabs 35 and 36 at a bottom edge of trim panel 20 keep trim panel 20 engaged with substrate 10. Manually operable fasteners 37 and 38 interface with a matching structure of substrate 10, so that trim panel 20 can be locked down.

In a particularly advantageous embodiment, device 33 may be a wireless printer, such as a Pentax PocketJet printer available from Brother International Corporation of Bridgewater, N.J. Such a printer can communicate with a laptop computer within the vehicle to receive print jobs via a Bluetooth link, for example.

Figure 3:
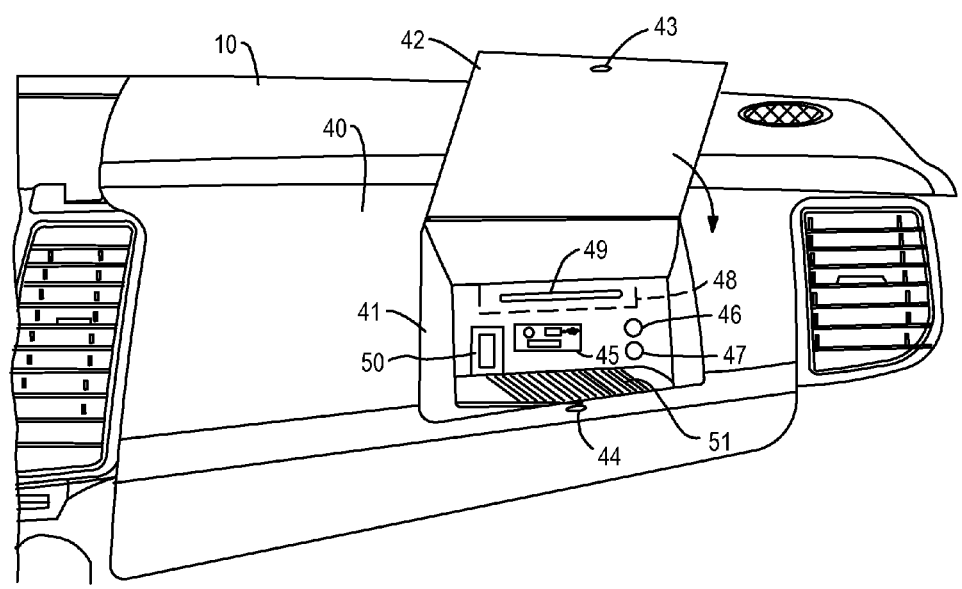
FIG. 3 is a front view of a second embodiment of the trim panel of the present invention.

FIG. 3 shows an alternative embodiment wherein a trim panel 40 includes a well 41 with a pivotable or slidable front door 42 for selectably covering well 41. A latch (such as a magnetic latch including magnets 43 and 44) may be provided to secure door 42 in the closed position. In addition to the connector hub 45, power points 46 and 47, rear mounted device 48 and access slot 49, well 41 may include a recharger socket 50 adapted to a particular device such as a rechargeable wireless microphone system which is commonly used in police vehicles. A non-skid surface 51 may also be provided.

Figure 4:
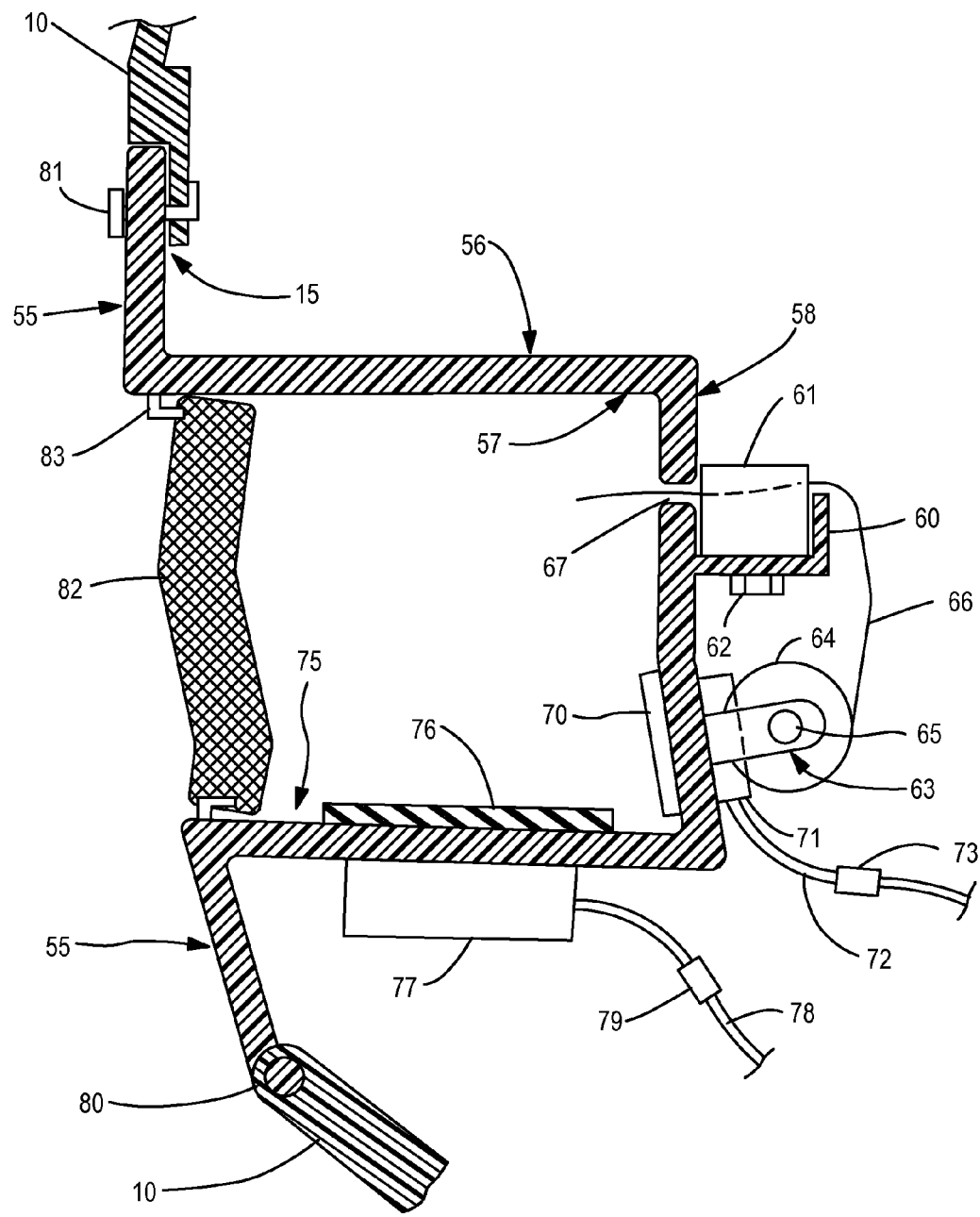
FIG. 4 is a side cross-sectional view of a third embodiment of the trim panel of the present invention.

FIG. 4 shows another embodiment, in side cross section, wherein a trim panel 55 is mounted to instrument panel substrate 10 within opening 15. Trim panel 55 includes a well 56 with a front side 57 and a rear side 58. A cradle 60 is mounted to or integrally molded with rear side 58 of well 56 for accommodating a printer 61. A fastener or cradle length-adjustment knob 62 is provided on cradle 60 for capturing printer 61 in a releasable and secure manner. A paper holder 63 is also mounted to rear side 58 for receiving a paper roll 64. A quick release knob or pull-tab 65 allows for changing of paper roll 64. Paper 66 is fed from roll 64 through printer 61 and out through a slot 67 in well 56. A connector hub 70 is mounted to front surface 57 in well 56 and has a rear electrical housing 71 behind trim panel 55 connected to a wiring loop 72 of a vehicle wiring harness (not shown). A quick-disconnect electrical connector 73 may be included to facilitate the opening of trim panel 55. Connector 73 may alternatively comprise a twist joint or other means for managing the electrical wiring while trim panel 55 is opened and closed.

A floor 75 of well 56 carries a non-skid mat 76 upon which electronic devices may be placed. For devices that are capable of inductive recharging, an inductive charger 77 is mounted to well 56 and receives electrical power via a wiring loop 78. Wiring loop 78 may also include a twist joint or quick release connector 79.

The bottom edge of trim panel 55 is coupled to instrument panel substrate 10 via a hinge 80. Alternatively, tabs and slots may also be used to pivotally support the bottom edge of trim panel 55. Along the top edge of trim panel 55, manually operable fastener 81 can be selectably locked to instrument panel substrate 10 using any conventional technique such as a quarter-turn cam lock or other captive fasteners.

In order to ensure retention of portable devices that may be stowed within well 56, a door or other closure may preferably be provided at the entrance to well 56. As shown in FIG. 4, a cargo net 82 can be installed using a plurality of clasps 83.

Figure 5:
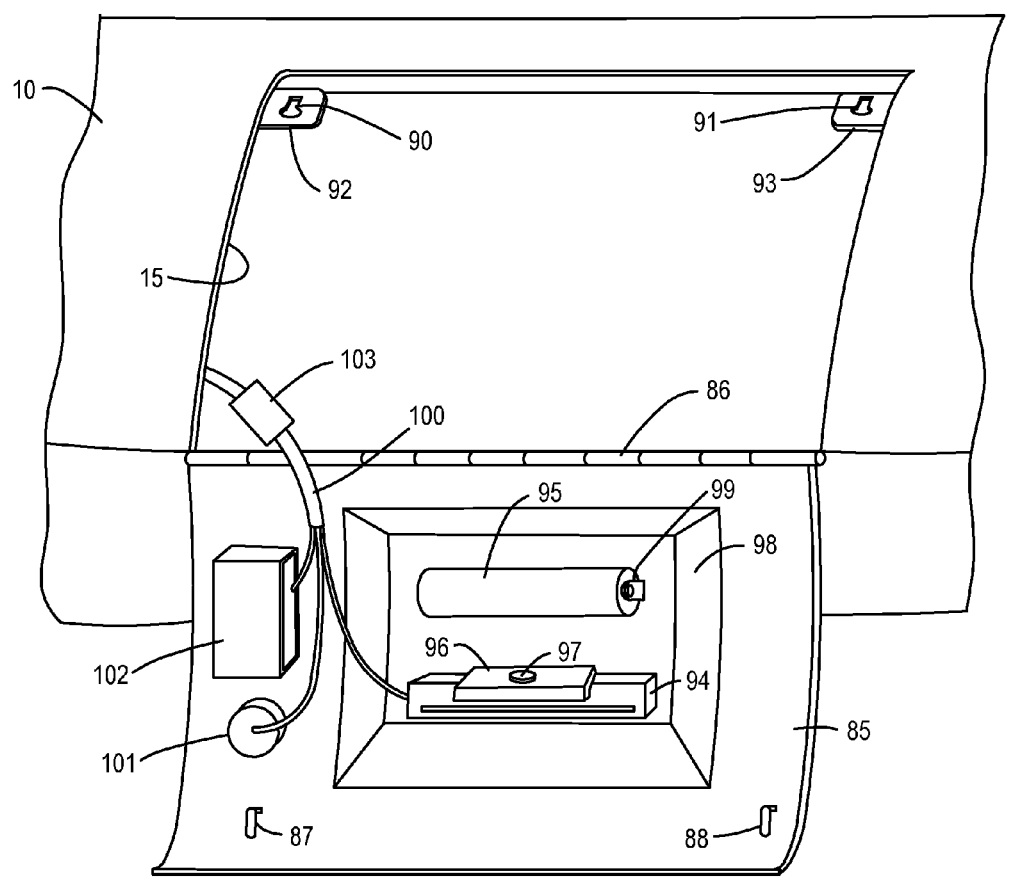
FIG. 5 is a front view of a fourth embodiment of the trim panel of the present invention with the trim panel opened to access its rear side.

FIG. 5 shows an embodiment similar to FIG. 4 in an open position. A trim panel 85 is attached to instrument panel substrate 10 by a hinge 86 in order to selectably cover opening 15. Rotating legs 87 and 88 cooperate with slots 90 and 91 on lock tabs 92 and 93 that extend from substrate 10 when trim panel 85 is closed. With trim panel 85 in its open position, rear mounted printer 94 and paper roll 95 can is be accessed. A cradle 96 with a device lock 97 receives printer 94 in alignment with a paper slot (not visible) within well 98 of trim panel 85. Paper holder 99 retains paper roll 95 and allows easy replacement of a new roll.

A wiring harness 100 includes electrical conductors for providing power to printer 94. In addition, harness 100 provides electrical connections to a power point 101 and a connector hub 102. If a printer without wireless capability is used, a USB or other type of cable may installed between the printer and the rear side of a USB connector in connector hub 102 so that a laptop in the passenger compartment of the vehicle can communicate with the printer via a second USB cable between the laptop and the USB connector in hub 102. A twist connector 103 facilitates movement of the wiring harness during opening and closing of trim panel 85.

What is claimed is:

1. An interior system of a vehicle comprising:
   an instrument panel substrate having a driver side, a passenger side, and a center section between the driver and passenger sides, the instrument panel substrate having an opening on the passenger side; and
   a trim panel mounted to the instrument panel substrate covering the opening and comprising a connector hub having a plurality of electrical connectors for providing electrical power to mobile electronic devices;
   wherein at least a portion of the trim panel is releasable and pivotable after mounting in order to access a rear side of the trim panel, and wherein the trim panel further comprises a cradle on the rear side to receive a printer, a paper holder on the rear side to receive and supply paper for the printer, and an elongated slot aligned with the cradle for feeding printed paper from the printer to a front side of the trim panel.

2. The interior system of claim 1 wherein the trim panel includes at least a portion which is pivotable by a user of the vehicle.

3. The interior system of claim 1 wherein the trim panel comprises a storage well, wherein at least a portion of the connector hub is mounted within the storage well.

4. The interior system of claim 1 wherein the trim panel comprises a storage well, wherein the trim panel further comprises a recharging station for docking one of the mobile electronic devices.

5. The interior system of claim 1 wherein the trim panel comprises a storage well having a floor, an upper side of the floor having a non-skid surface and a lower side of the floor having an inductive charging unit mounted thereon.

6. The interior system of claim 1 wherein the cradle and the connector hub receive a service loop of a wiring harness of the vehicle.

7. The interior system of claim 1 wherein the trim panel includes manually operable connectors for selectably releasing or locking the trim panel with the instrument panel substrate.

* * * * *